Sept. 23, 1969  A. E. JENSEN  3,468,720
PROCESS FOR ASSEMBLING AN ELECTRICAL STORAGE BATTERY
Filed Jan. 19, 1968  2 Sheets-Sheet 1
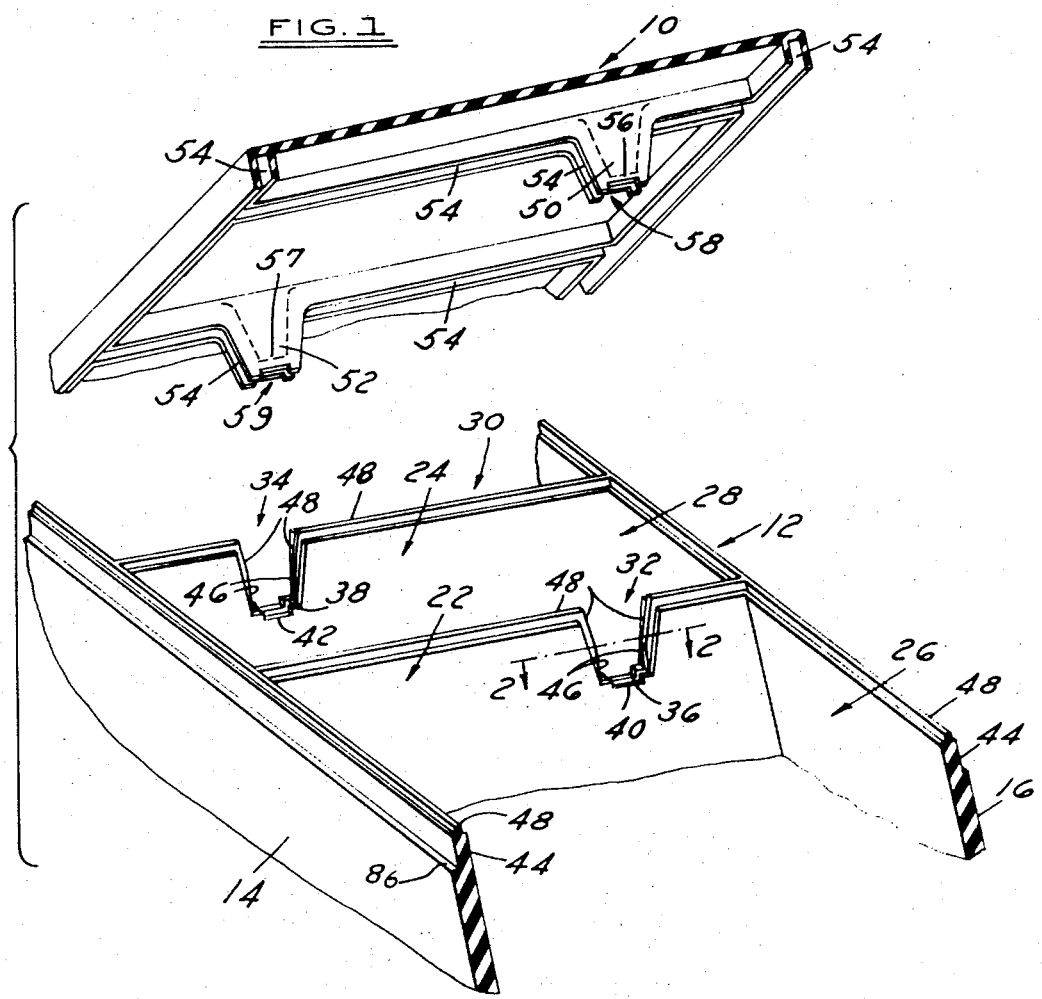
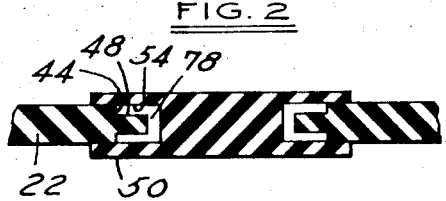
ARVID E. JENSEN
INVENTOR.
BY
John R. Faulkner
Glenn L. Arendsen
ATTORNEYS

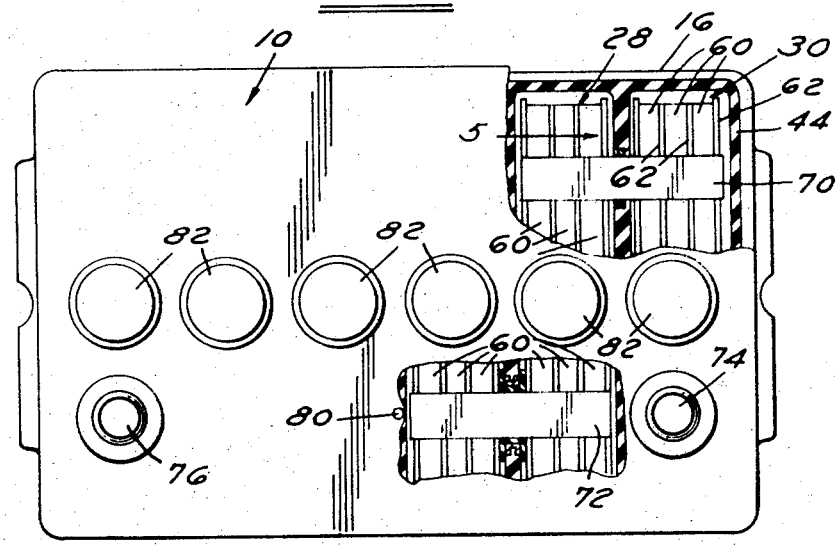
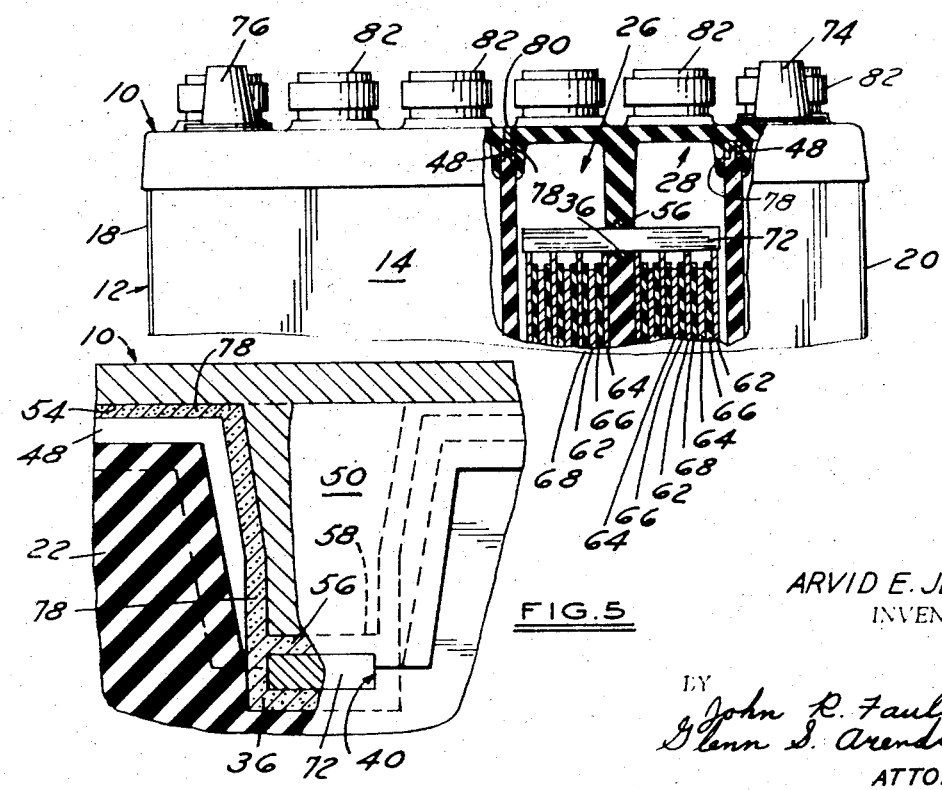

United States Patent Office 3,468,720
Patented Sept. 23, 1969

3,468,720
PROCESS FOR ASSEMBLING AN ELECTRICAL STORAGE BATTERY
Arvid E. Jensen, Ypsilanti, Mich., assignor to Ford Motor Company, Dearborn, Mich., a corporation of Delaware
Filed Jan. 19, 1968, Ser. No. 699,249
Int. Cl. H01m 1/02
U.S. Cl. 136—176
6 Claims

ABSTRACT OF THE DISCLOSURE

This electrical storage battery has a plurality of cells with relatively short connections between cells. Straight intercell connectors rest on the bottom of openings formed in the partitions separating the cells and depending flanges formed on the cover fit into the openings. Channels are formed in each opening below the connector and in the flange above the connector. A tongue is formed on the top of the side walls and a continuous groove corresponding to the partitions and the tongue is formed in the battery cover and along the sides of the flanges. The partitions and tongue fit into the groove to form a tongue and groove construction but leave a continuous channel between the tip of the tongue and the bottom of the groove. This channel communicates with the channels below and above the intercell connector. Sealing material is forced into the channels through an opening in the cover to fill the channels around the intercell connector and between the tongue or partitions and groove to produce a fluid tight battery. The end of the tongue and the tops of the partitions contain a projection extending into the channel to increase the bonding area.

SUMMARY OF THE INVENTION

In most commercially available multicell batteries, intercell connections extend above the partition and attach to straps in the cover crossing over the partition to the adjacent cell. This arrangement produces an objectionably long intercell connection that raises internal resistance of the battery, especially when the battery is discharging at a high rate. Recent developments have reduced the length of the intercell connector by passing the connector across the top of the partition just below the cover. Then the connector length was reduced still further by forming an opening in the partition and passing the connector through the partition approximately level with connections of the connector to the plates in the cells. An absolutely fluid tight seal around the connector is necessary in these constructions to prevent leakage of electrolyte from cell to cell and consequent battery discharge.

While these constructions significantly reduced intercell resistance, difficulties were encountered in sealing around the connector and in sealing the cover to the casing. In the ordinary assembly process, sealing material was applied to the connector and cover, the connector was located in the casing, and the cover then was positioned in place. Because of the difficulties in handling live sealing material openly during mass production assembly operations, assembly time and costs were high and sealing deficiencies were widespread.

This invention provides a process for assembling an electrical storage battery having a plurality of cells with relatively short interconnections between cells that reduces assembly time and greatly improves the seals around the intercell connector and between the battery casing and cover. The process comprises forming a battery casing having at least one partition dividing the casing into cells with an opening in the upper portion of the partition and a channel traversing at least the lower part of the opening. After the battery plates are inserted in the cells, an electrically conducting intercell connector is placed in the opening over the channel therein with the ends of the connector electrically attaching the plates in one cell to the plates in another cell. A cover for the casing is formed with a depending flange fitting into the opening in the partition with a channel traversing at least the part of the flange located above the interconnector. The cover fits on the casing with a tongue and groove construction between the cover, the peripheral walls of the casing, and the partition including the sides of the opening except for the areas immediately above and below the intercell connector.

The tongue and groove construction leaves a channel between the tip of the tongue and the bottom of the groove and this channel communicates with the channels above and below the intercell connector. Sealing material is forced into the channels through openings in the cover, filling the channels between the tongue and groove and surrounding the intercell connector. The sealing material then is cured to form fluid tight joints between the casing, cover, and connector.

A flat bar of conductive, acid-resistant material such as lead preferably serves as the intercell connector. The bar is completely surrounded by the channels which accept sealing material to form a fluid tight seal around the bar. Preferably, a small projection is formed on the tip of the tongue and this projection extends into the channel remaining between the tongue tip and the groove bottom to increase the contact area for the sealing material. Sealing material is injected into the channels while the battery is clamped in a fixture. The fit between the sides of the tongue and the groove and between the flange, connector, and opening is controlled to permit the air to escape while sealing material is flowing through the channels while being sufficiently tight to contain virtually all sealing material.

BRIEF DESCRIPTION OF THE DRAWINGS

FIGURE 1 is an exploded view of the battery casing and cover showing the channels in the lower part of the partition opening and the lower part of the flange, the tongue formed on the casing, and the groove formed in the cover. FIGURE 2 is a partial sectional view taken at line 2—2 of FIGURE 1 through the flange of an assembled cover and casing showing the relationship of the tongue tip to the groove. FIGURE 3 is a plan view of the assembled battery with portions broken away to show two intercell connections. The upper portion is broken away to a depth just above the bottom of the intercell connector while the lower portion is approximately even with the top of the intercell connector. FIGURE 4 is an elevation view of the assembled battery of FIGURE 3 with a portion broken away to show the channels formed in the flange and opening above and below the intercell connector. FIGURE 5 is a partial sectional view taken in the direction of arrow 5 in FIGURE 3 showing the assembled relationship of the partition, flange and intercell connector.

DETAILED DESCRIPTION

In FIGURE 1 a portion of a battery cover 10 is poised above a portion of a battery casing 12. Casing 12 has side walls 14 and 16, end walls 18 and 20 (see FIGURE 4) and a bottom (not shown). A plurality of partitions, two of which are designated by numerals 22 and 24 in FIGURE 1, divide the casing into a plurality of cells designated by numerals 26, 28 and 30. Partition 22 has an opening 32 in its upper portion proximate to side wall 16, and partition 24 has a similar opening 34 proximate to side wall 14. Shallow notches 40 and 42 are formed in the bottoms of openings 32 and 34, respectively, and shallow channels 36 and 38 extend laterally across the bottoms of openings 32 and 34. Notches 40 and 42 are sufficiently shallow so portions of channels 36 and 38 exist beneath the respective notch.

A continuous tongue 44 is formed at the upper end of the peripheral walls 14, 16, 18 and 20. A short, square projection 48 is formed on the top of tongue 44 and partitions 22 and 24. Projection 48 runs down the sides of openings 32 and 34 and tapers as designated by numeral 46 toward the lower corners of the openings.

Cover 10 has a plurality of depending flanges, two of which are designated by numerals 50 and 52, located to fit into the respective openings 32 and 34. A continuous groove 54 is formed in appropriate cover material along the edges of the cover so the groove 54 corresponds to the peripheral walls and the partitions of the casing. Groove 54 runs down the sides of the flanges 50 and 52 and communicates with channels 56 and 57 extending laterally across the bottoms of the flanges. The bottom of each flange also has a notch 58, 59 corresponding in size and shape to notches 40, 42, with notches 58, 59 being sufficiently shallow to permit portions of channels 56 and 57 to exist above the notches.

Ordinarily, the cover and casing are molded individually from a nonconductive hard rubber or polymeric material such as polypropylene resistant to acid, petroleum products, and other materials encountered in engine compartments. The typical automobile battery contains five partitions dividing the battery into six cells.

Referring to FIGURES 3 and 4, each of the cells contains a plurality of plate assemblies 60 made up of a positive plate 62 and a negative plate 64 spaced by a separator 66. An additional separator 68 separates adjacent plate assemblies (see FIGURE 4). In cell 30 located at the right side of FIGURE 3, each positive plate 62 is connected to an intercell connector 70 located in notch 42 at the bottom of opening 34. Connector 70 is a flat, straight bar of conductive, acid-resistant material and extends into adjacent cell 28 where it electrically contacts the negative plates 64 of cell 28. The electrical connections between the connector 70 and the plates can be made by any conventional process such as puddling or casting. Plates and intercell connectors can be subassembled and located in the casing as a unit or the intercell connector can be located in the casing individually.

An identical connector 72 connects the positive plates 62 of cell 28 to negative plates 64 of cell 26 (FIGURE 4). Additional connectors connect the positive plates of cell 26 to the negative plates of the adjoining cell and continue in this fashion to interconnect the plates of each cell. The negative plates in cell 30 are connected to battery terminal 74 and the positive plates in the cell at the left side are connected to terminal 76.

After the plate assemblies and intercell connectors are located in the battery casing, the battery cover 10 is fitted onto the casing so flanges 50 and 52 fit into openings 32 and 34 with the other flanges (not shown) fitting into the other appropriate openings (not shown). Notches 58 and 59 fit over the intercell connectors 72 and 70 and, along with the external step 86 running around the casing periphery, determine the vertical position of cover 10 relative to casing 12. The sides of tongue 44 and partitions 22, 24, etc., have up to about 0.040 inch clearance with the sides of groove 54 and leave a channel 78 about 0.1 inch deep between projection 48 and the bottom of groove 54 (see FIGURES 2, 4 and 5). Channel 78 communicates with channels 36 and 56 below and above connector 72, with channels 38 and 57 below and above connector 70, etc. Channels 36 and 56 combine to surround completely connector 70 with the corresponding channels surrounding the corresponding connectors in a similar manner.

The cover and casing then are clamped into a fixture to prevent relative movement and a fluid sealing material is injected into channel 78 through appropriate openings 80 located in the cover. For conventional automobile batteries, injecting sealing material into at least two openings per cell produces the best results. Sufficient pressure is applied to the sealing compound to force it through channels 78, 36 and 56. The air in the channels escapes along the sides of the tongue but the clearance is insufficient to permit significant amounts of sealing material to escape.

After all channels are filled, the sealing material is cured by the mild application of heat if necessary. Typical sealing materials include the epoxy resins, asphalt compounds, polymeric materials such as polystyrene, and other acid-resistant materials. After curing, the completed battery is removed from the fixture and can be placed into service by introducing electrolyte into each cell through appropriate openings in the cover closed by caps 82.

Carrying out the process of this invention thus produces a fluid tight joint around the intercell connectors and between the battery cells without requiring workmen to handle live sealing material. Projection 48 increases the sealing area for the sealing material in channel 78 and thereby produces a stronger, tighter assembly. Maintaining small clearances along the sides of the tongue sufficient to bleed air out of the channel but insufficient to pass sealing material results in excellent seal quality.

In place of the relatively narrow openings 32 and 34 shown in the drawings, a wide opening extending along the entire width of the partitions can be used. A correspondingly wider flange then is formed on the cover. Alternatively, a short channel can be formed in the top of a level partition that contains an opening corresponding to notch 58 only. When the intercell connectors are assembled to the battery plates before the plates are positioned in the cells, the opening can be eliminated and the channel intended to seal the bottom of the connector formed at the top of the open end of a partition. If desired, the tongue can be formed on the cover and the groove formed in the casing.

What is claimed is:

1. A process for assembling an electrical storage battery having a plurality of cells with relatively short interconnections between cells comprising
    forming a battery casing having at least one partition dividing said casing into cells, said partition having an opening in the upper portion thereof with a channel traversing part of the opening,
    positioning battery plates in said cells and an electrically conducting intercell connector in said opening over the channel therein so said connector electrically connects plates in one cell to plates in another cell,
    forming a cover for said casing, said cover having a depending flange fitting into said opening over said intercell connector with a channel traversing the part of said flange adjacent the connector, said cover having a groove located opposite the partition and extending along the sides of said flange to communicate with said channel in said flange,
    fitting said cover on said casing so the partition extends into the groove to form a tongue and groove construction but leaves a channel between the tip of the partition and the bottom of the groove, said channel communicating with the channels in said opening and said flange,
    filling all of said channels with a sealing material, and curing said sealing material to form fluid tight joints between said casing, cover, and intercell connector.

2. The process of claim 1 in which the channels are filled with sealing material by injecting flowable sealing material through an opening in the cover.

3. The process of claim 2 in which the sides of the partition clear the sides of the groove by a space sufficient to bleed air from the channel while sealing material is being injected but insufficient to pass a significant amount of sealing material.

4. The process of claim 3 comprising forming a small projection on the tip of the partition to increase the sealing area between the cover and the casing.

5. A process for assembling an electrical storage battery having a plurality of cells comprising forming a battery casing having at least one partition dividing said casing into cells, said partition having a channel traversing at least a part of its open end, positioning battery plates in said cells and an electrically conducting intercell connector above said channel so said connector electrically connects plates in one cell to plates in another cell, forming a cover for said casing, said cover having a channel traversing at least the part of said cover above said connector, forming a groove in one of said casing and cover and a tongue on the other except for the portion containing said channel, said groove being slightly deeper than necessary to accommodate said tongue, fitting said cover on said casing to produce a tongue and groove construction while leaving a channel between the tip of the tongue and the bottom of the groove, said channel communicating with the channels above and below said connector, filling all of said channels with a sealing material, and curing said sealing material to form fluid tight joints between said casing, cover, and intercell connector.

6. The process of claim 5 in which the intercell connector is assembled to the battery plates prior to positioning the battery plates into the cells.

References Cited
UNITED STATES PATENTS

| | | | |
|---|---|---|---|
| 3,253,962 | 5/1966 | Deprill et al. | 136—134 |
| 3,309,232 | 3/1967 | Wilson | 136—134 |
| 3,386,860 | 6/1968 | Maier | 136—134 |

WINSTON A. DOUGLAS, Primary Examiner

D. L. WALTON, Assistant Examiner

U.S. Cl. X.R.

136—134, 170